No. 665,979. Patented Jan. 15, 1901.
C. RESTEIN.
PACKING.
(Application filed Oct. 9, 1900.)
(No Model.)
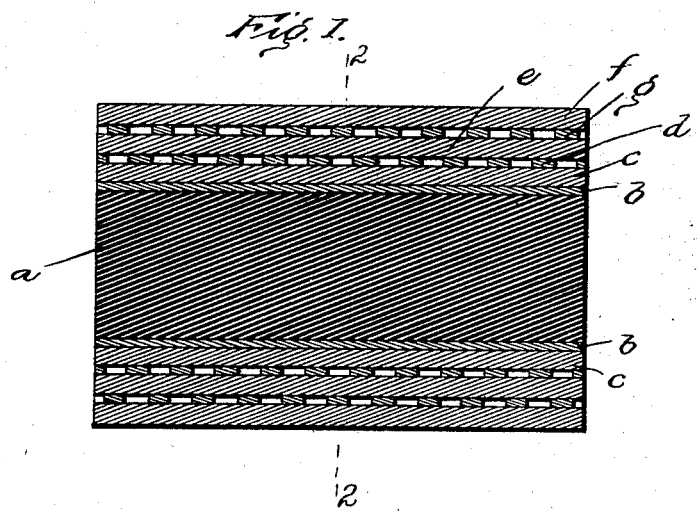
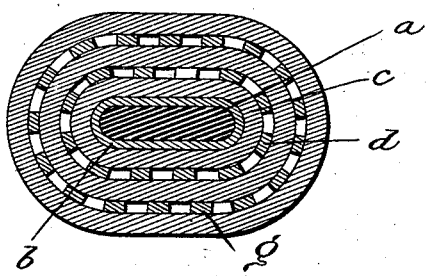
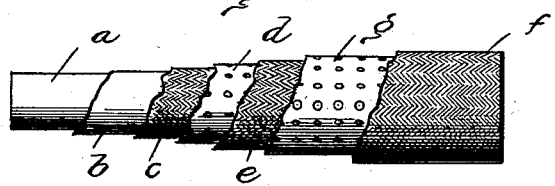

UNITED STATES PATENT OFFICE.

CLEMENT RESTEIN, OF PHILADELPHIA, PENNSYLVANIA.

PACKING.

SPECIFICATION forming part of Letters Patent No. 665,979, dated January 15, 1901.

Application filed October 9, 1900. Serial No. 32,534. (No model.)

*To all whom it may concern:*

Be it known that I, CLEMENT RESTEIN, a citizen of the United States, residing at Philadelphia, in the county of Philadelphia and State of Pennsylvania, have invented certain new and useful Improvements in Packing, of which the following is a specification.

One object of the present invention is to retain the lubricant under conditions of use and to prolong or increase the effective life of the packing.

A further object is to protect the rubber, when used as a core, from contact with the lubricant.

To these and other ends hereinafter set forth the invention, stated in general terms, consists of a packing comprising a core, as rubber, and suitable soft or textile wrappings or braidings having interposed between them one or more metallic coverings, as will be hereinafter more fully described and claimed and as illustrated in the accompanying drawings, forming part hereof, and in which—

Figure 1 is a longitudinal sectional view of a packing embodying features of the invention. Fig. 2 is a sectional view taken on the line 2 2 of Fig. 1, and Fig. 3 is a view of the packing with parts broken away to illustrate the relative positions of the different materials.

Heretofore the effective life of packing has been comparatively short because the core when made of rubber caused it to deteriorate and lose its elasticity and thus shorten the life of the packing and since in use in a stuffing-box the packing is exposed to heat the lubricant melts, and therefore runs out or is extracted too rapidly, thereby depriving the fibrous braiding of lubrication and leaving it in a condition to burn or crumble. In order to overcome these disadvantageous features, use may be made, in the present invention, of metallic linings of both an imperforate and perforate nature, or either of them. These linings are interposed between the different portions of the wrappings or braidings, and, as shown in the drawings, $a$ is a core or strip of vulcanized soft rubber, enveloped in an imperforate covering $b$ of a soft metallic nature, as lead, tin, or suitable alloys. Such a metallic lining prevents any lubricant from coming in contact with the rubber, and obviously this is advantageous, because it protects it and prolongs its effective resiliency.

$c$ is a fibrous covering of linen, jute, cotton, or hemp fibers or threads woven and braided so as to envelop the aforesaid portions. Around this portion $c$ is placed another metallic cover $d$, which is perforated to allow for the gradual escape of the lubricating materials.

$e$ and $f$ are coverings similar to $c$, and $g$ is a covering similar to $d$.

The complete packing is saturated with lubricating material.

Obviously more metallic linings and fibrous coverings may be employed or some may be dispensed with, as occasion demands, the number of parts shown in the drawings being merely of an explanatory nature.

Such a packing will wear not only for a comparatively great length of time, but also evenly and uniformly and continue to distribute the lubricant throughout its long life. When one of the outer fibrous covers wears away, the part being lubricated comes into contact with a soft metal which will readily conform to any irregularity of said part and in no way interfere with the lubrication of the aforesaid part.

It will be obvious to those skilled in the art to which the invention relates that modifications may be made in details without departing from the spirit thereof. Hence I do not limit myself to the precise construction and arrangement of parts hereinabove set forth, and illustrated in the drawings; but,

Having thus described the nature and objects of the invention, what I claim as new, and desire to secure by Letters Patent, is—

1. A packing having layers of absorbent woven material and perforate metallic sheets interposed between and enveloping its layers to permit of the passage of lubricants from layer to layer, substantially as described.

2. A packing having perforate metallic sheets interposed between and enveloping its layers and having an imperforate sheet wrapped around its core, substantially as described.

3. A packing comprising a strip or core of elastic material, an imperforate metallic covering enveloping said elastic material, one or more fibrous coverings enveloped by one or more perforate metallic coverings, and a fibrous covering for binding said parts together, substantially as described.

In testimony whereof I have hereunto signed my name.

CLEMENT RESTEIN.

In presence of—
K. M. GILLIGAN,
W. J. JACKSON.